United States Patent [19]
Lai

[11] Patent Number: 5,564,035
[45] Date of Patent: Oct. 8, 1996

[54] EXCLUSIVE AND/OR PARTIALLY INCLUSIVE EXTENSION CACHE SYSTEM AND METHOD TO MINIMIZE SWAPPING THEREIN

[75] Inventor: Konrad K. Lai, Aloha, Oreg.

[73] Assignee: Intel Corporation, Santa Clara, Calif.

[21] Appl. No.: 216,802

[22] Filed: Mar. 23, 1994

[51] Int. Cl.$^6$ ........................................... G06F 12/02
[52] U.S. Cl. ........................ 395/471; 395/449; 395/460
[58] Field of Search ........................ 395/425, 471, 395/449, 460

[56] References Cited

U.S. PATENT DOCUMENTS 5,386,547  1/1995  Jouppi ........................ 395/449

OTHER PUBLICATIONS

"Some Thoughts On Memory System Research," Norman P. Jouppi (NSF Memory System Work Shop at the University of Virginia, Apr. 12–13, 1993).

Primary Examiner—Eddie P. Chan
Assistant Examiner—Kevin L. Ellis
Attorney, Agent, or Firm—Blakely, Sokoloff, Taylor & Zafman

[57] ABSTRACT

A multi-level memory system is provided having a primary cache and a secondary cache in which unnecessary swapping operations are minimized. If a memory access request misses in the primary cache, but hits in the secondary cache, then the secondary cache responds to the request. If, however, the request also misses in the secondary cache, but is found in main memory, then main memory responds to the request. In responding to the request, the secondary cache or main memory returns the requested data to the primary cache. If an address tag of a primary cache victim line does not match an address tag in the secondary cache or the primary cache victim line is dirty, then the victim is stored in the secondary cache. The primary cache victim line includes a first bit for indicating whether the address tag of the primary cache victim line matches an address tag of the secondary cache.

24 Claims, 5 Drawing Sheets

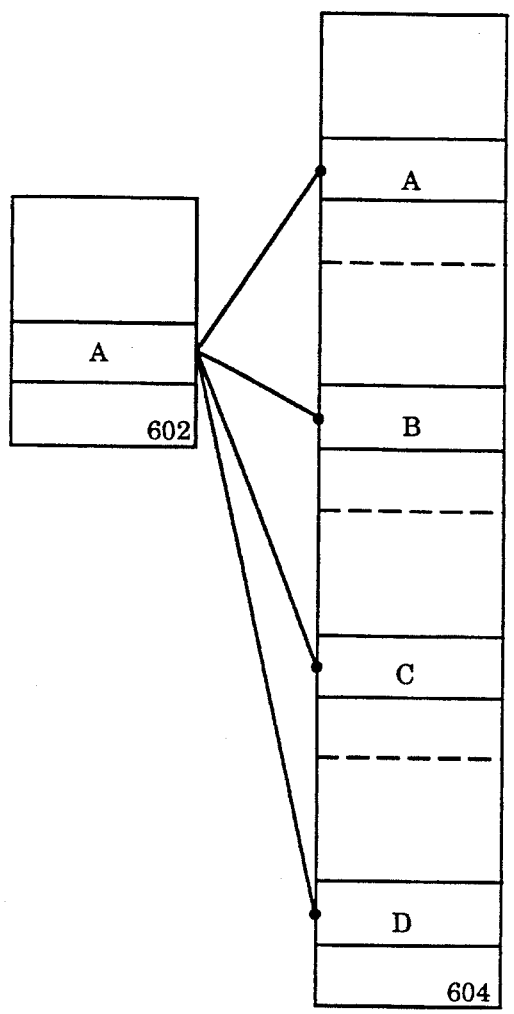
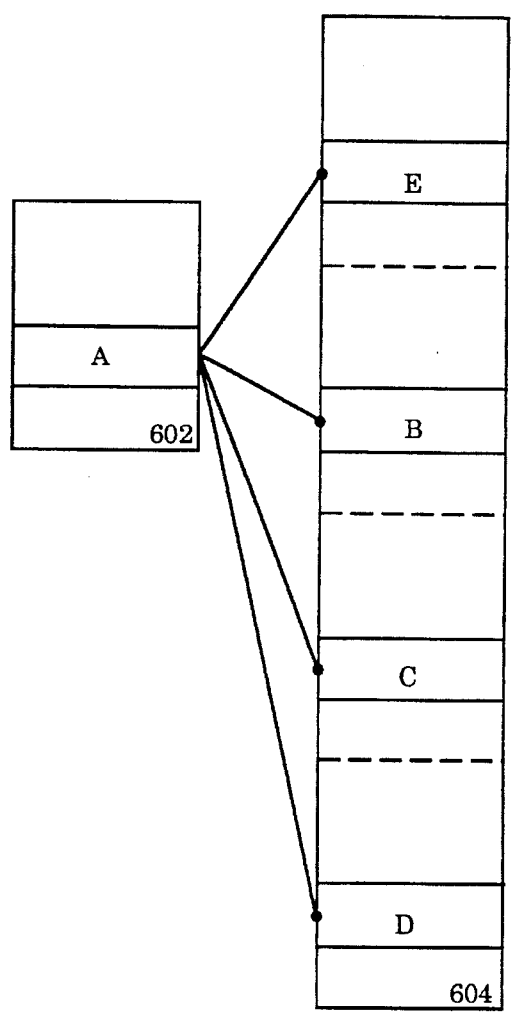
*Figure 6(a)*      *Figure 6(b)*

5,564,035

EXCLUSIVE AND/OR PARTIALLY INCLUSIVE EXTENSION CACHE SYSTEM AND METHOD TO MINIMIZE SWAPPING THEREIN

BACKGROUND OF THE INVENTION

1. Field of the Invention

The present invention relates to data processing systems utilizing cache memories, and more particularly to multi-level cache memories.

2. Art Background

Caches are used in various forms to reduce the effective time required by a processor to access instructions or data that are stored in main memory. The theory of a cache is that a system attains a higher speed by using a small portion of very fast memory as a cache along with a larger amount of slower main memory. The cache memory is usually placed operationally between the data processing unit or units and the main memory. When the processor needs to access main memory, it looks first to the cache memory to see if the information required is available in the cache. When data and/or instructions are first called from main memory, the information is stored in cache as part of a block of information (known as a cache line) that is taken from consecutive locations of main memory. During subsequent memory accesses to the same addresses, the processor interacts with the fast cache memory rather than main memory. Statistically, when information is accessed from a particular block in main memory, subsequent accesses most likely will call for information from within the same block. This locality of reference property results in a substantial decrease in average memory access time.

FIG. 1 is a simplified block diagram of a cache 100. The cache includes a set of cache lines 102. Each cache line 102 is capable of storing a block of data 104 from consecutive addresses in main memory. Each cache line 102 is associated with a tag 106, which represents the block address of the line. A valid bit 108 indicates that the cache line contains valid data. A dirty bit 110 indicates cache coherency, i.e., whether or not the data in the cache accurately reflects the data maintained in the same address in main memory or other memory units. The reading and writing of data in the cache is controlled by a cache access logic circuit 112.

The use of cache memory in the context of a computer system is illustrated in FIG. 2. A first CPU1 200 interacts with a cache L1 202 over an internal CPU bus 204. The cache L1 202 interacts with main memory 206 over a system bus 208. A second processor CPU2 210 also may access memory 206 over the system bus 208.

When the CPU1 200 attempts to access the main memory 206, the address issued by the CPU1 200 is presented to the cache access logic in the cache L1 202. The cache access logic compares the relevant part (the tag field) of the physical address containing the block address to addresses it currently stores in the tag array of the cache 202. If there is a match, i.e., a cache hit, then the data found at the referenced address is returned to the processor 200 if the memory access is a read operation. If the processor 200 is attempting to write to memory, then the processor 200 writes the data to the cache line that resulted in a cache hit. If, however, the address fails to match any of the tag addresses, i.e., a cache miss occurs, then the cache access logic of the cache 202 causes the main memory data block containing the information at the addressed location to be copied into the cache 202. In conjunction with this operation, the cache access logic also sets the corresponding valid bit to indicate that that cache line has been allocated.

Computer systems implement a number of policies to update main memory when a write operation from the processor 200 changes the contents of the cache 202. Under a write through policy, when the processor 200 writes to the cache 202, the corresponding data is also updated in the main memory 206. Under a write back policy, the data in main memory is updated only when the cache line containing the modified data is forced out of the cache 202 or when an external processor such as processor 210 needs to access the data. A cache line may be forced out of the cache 202, for example, if it is the least recently used (LRU) cache line. By its very nature, the write back policy results in less traffic on the system bus 208 between the cache 202 and the memory 206.

Under the write back policy, the processor 200 updates data in cache 202 without immediately updating data found at the same address in memory 206. This results in inconsistency or incoherency between the cache 202 and main memory 206. When this happens, the cache access logic sets the dirty bit in the corresponding cache line. The cache 202 "snoops" the address lines from the system bus 208 to determine whether any device is attempting to access data found in the cache 202. If so, the cache access logic causes the cache 202 to write the data into main memory 206 so that it is available to the second processor 210. When doing so, the cache access logic also resets the dirty bit of the corresponding cache line to indicate that the data in the cache 202 is now consistent with that in memory 206.

Caches may be arranged in a multi-level configuration as shown in FIG. 3. Here, a second level cache L2 203 is interposed between the first level cache L1 202 and the system bus 208. The L2 cache 203 is slower but larger than the L1 cache 202. Typically, the L2 cache 203 is used under an inclusion policy which dictates that all the contents of the L1 cache 202 are maintained in the L2 cache 203. In general, in a multi-level cache system containing more than two caches, all the contents of the level N cache are stored in the level N+1 cache.

The advantage of duplicating information in the L2 cache is that the L2 cache 203 can maintain multiprocessor coherency without involving the first level cache L1 202. For example, L2 cache 203 performs the snooping of memory access requests over system bus 208, which frees the first level cache 202 to be dedicated to interactions with the first processor 200. If the second processor 210 performs a write to memory, the L2 cache 203 may detect a hit and update its corresponding cache line or invalidate the corresponding valid bit. Further, the L2 cache 203 may pass the address on to the L1 cache 202. If there is a hit in the L1 cache 202, then the corresponding cache line can be invalidated or updated with an invalid signal or data, respectively, passed on by the L2 cache 203. Some systems always update data and some always invalidate entries according to the particular memory management policy used by the system. For a read operation by the second processor 210, when it attempts to access a memory location that has been cached (in the dirty state) in the second level cache 203, the L2 cache 203 provides the data to main memory 206. From the above description, it can be seen that the interposition of the second level cache 203 provides some isolation of the L1 cache 202 from the traffic on the system bus 203.

The size of a level N+1 cache is typically much greater than that of a level N cache. In that case, the cost of storing the contents of a level N cache twice is minimal. On the other hand, the overhead becomes unacceptably high if the next level cache is only two to four times larger. Perhaps the most important situation in which this may occur is when the second level cache is designed to be placed on the same chip die as the first level cache. By doing so, the width of the data path between the two caches can be drastically increased to a data path on the order of 128–256 lines. However, a disadvantage of two-level caching under the inclusion policy is that if the ratio in size between first level and second level caches is small, much of the second level cache will consist of data that is already in the primary cache. Then, most misses in the primary cache will also miss in the second level cache. In this situation adding a second level cache can get in the way by adding delay between the first level cache miss and an off-chip access more than it helps by reducing the off-chip miss rate.

It is therefore desired to increase the efficiency of a multi-level caching configuration, especially in the case when the sizes of caches on adjacent levels are relatively similar.

SUMMARY OF THE INVENTION

The present invention overcomes the disadvantages of the prior art by providing a multi-level cache system in which the higher level cache is treated as an extension of the lower level cache, rather than as containing a duplicate of the lower level cache. The present invention ensures that the higher level cache is noninclusive, i.e., the higher level cache does not include all the data found in the lower level cache. In certain cache memory configurations, the present invention guarantees that the higher level extension cache is an exclusion cache, i.e., the contents of the lower level cache and the higher level extension cache are mutually exclusive.

The present invention handles memory accesses according to the following three cases:

1. Hit Primary

When a memory access from the processor coupled to the primary cache results in a hit, the primary cache returns the data to the processor in response to a read request, or allows data to be written to the matching cache line for a write request. The extension cache is not involved in this transaction.

2. Miss Primary—Hit Extension

When a memory access request misses the primary cache, it is sent to the extension cache together with a copy of the primary cache victim line that is to be displaced. If the request results in a hit in the extension cache, the matching cache line is sent to the primary cache. For a read operation, the primary cache returns the data from the cache line to the processor. In response to a write request, the processor writes data to the matching cache line in the primary cache. Under certain circumstances, the displaced victim line from the primary cache is written into a selected line of the extension cache, thus resulting in a swap. The line replacement logic for both the primary and the extension cache are updated to reflect that the line written into the primary cache from the extension cache is the most recently used cache line.

3. Miss Primary—Miss Extension

When a request misses the primary cache, it is sent to the extension cache together with a copy of the "victim" line to be displaced from the primary cache. In one embodiment, the cache victim lines are chosen according to an LRU policy. If the request misses in the extension cache, the access request is passed on to the next level in the memory configuration, which may be main memory. The requested data is returned from main memory to the requesting processor and the primary cache. The least recently used line of the extension cache is passed on to the next level cache if it is dirty. The victim line displaced from the primary cache is written into the LRU line of the extension cache. The logic for both the primary and extension cache is updated to reflect that the line written into the primary cache is the most recently used cache line.

In certain cache configurations, it may occur that under certain circumstances both the primary and extension caches cache the same "clean" data for particular cache lines. In that case, the extension cache is said to be noninclusive rather than exclusive, and swapping of the redundant data is unnecessary. Accordingly, the present invention provides a "first" bit in the primary cache, which when set indicates that the cache line containing the first bit is found only in the primary cache and not in the extension cache. Conversely, when the first bit is not set, that indicates that the data was previously written into the extension cache, and thus swapping is unnecessary unless the data is dirty. The use of the first bit minimizes swapping by eliminating unnecessary write back operations from the primary cache to the extension cache.

BRIEF DESCRIPTION OF THE DRAWINGS

The objects, features and advantages of the present invention will be apparent to one skilled in the art in light of the following detailed description in which:

FIG. 6a illustrates one example of a primary cache direct-mapped to an extension cache. FIG. 6b illustrates another example of a primary cache direct-mapped to an extension cache.

DETAILED DESCRIPTION OF THE INVENTION

The present invention provides an extension cache system and a related method for minimizing swapping between primary and extension caches. For purposes of explanation, specific embodiments are set forth to provide a thorough understanding of the present invention. However, it will be apparent to one skilled in the art that the invention may be practiced without these details. In other instances, well known elements, devices, process steps and the like are not set forth in detail in order to avoid unnecessarily obscuring the present invention.

Figure 1:
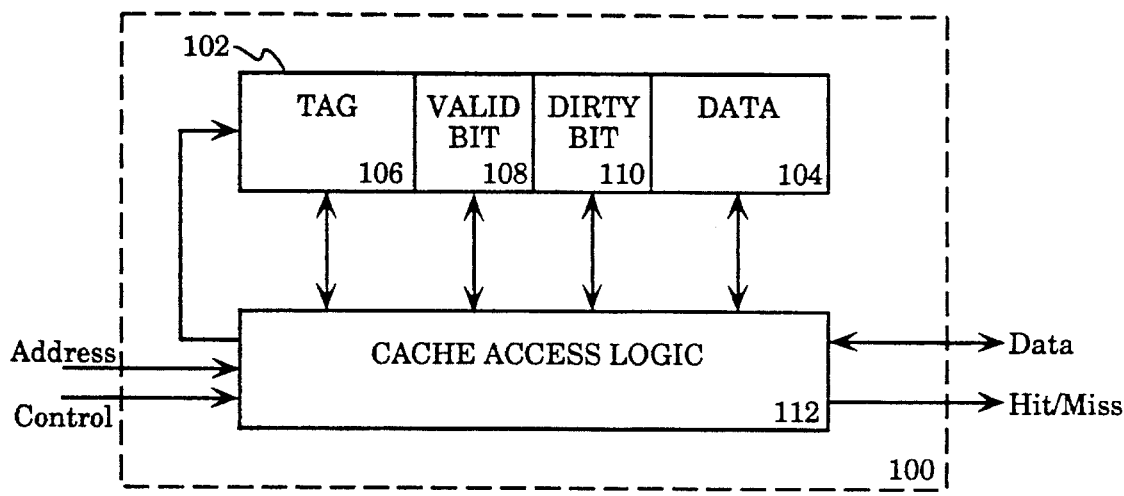
FIG. 1 is a block diagram of a conventional cache.
Figure 2:
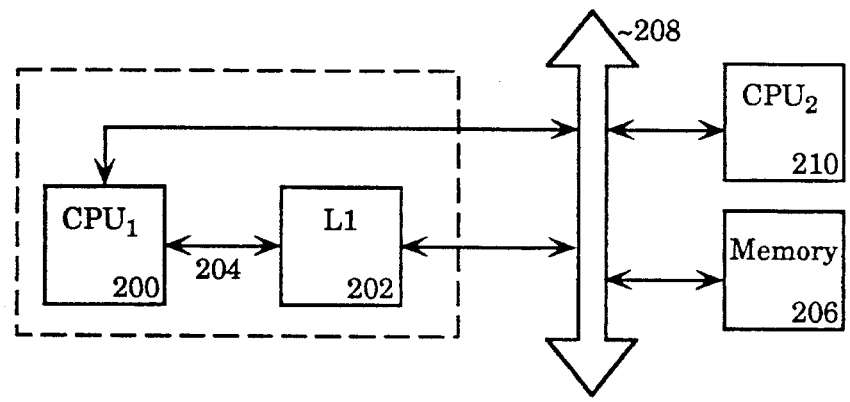
FIG. 2 is a block diagram of a computer system incorporating the cache of FIG. 1.
Figure 3:
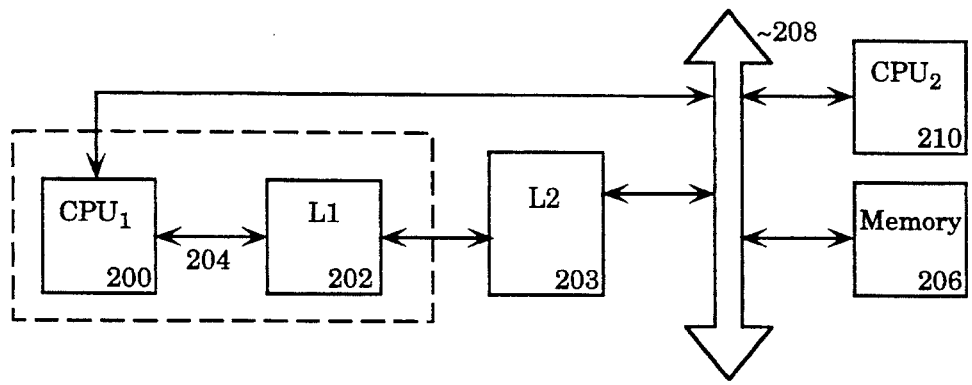
FIG. 3 is a multi-level cache memory configuration.
Figure 4:
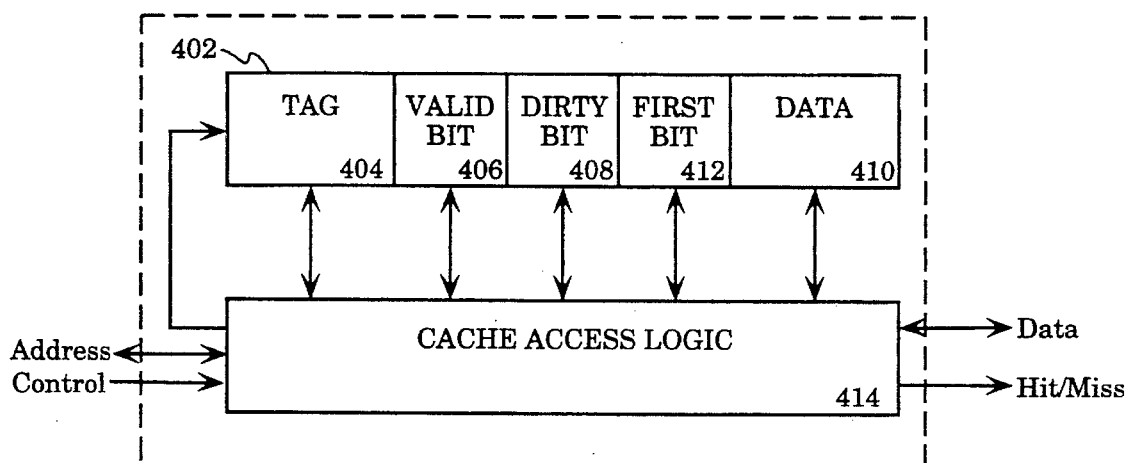
FIG. 4 is a block diagram of a cache of the present invention.

FIG. 4 illustrates a primary cache of the present invention. The cache includes at least one cache line 402 having a tag field 404, a valid bit field 406, a dirty bit field 408 and a data field 410. The cache line 402 also includes a "first" bit of the present invention 412. A cache access logic circuit 414 controls the response of the cache to memory access requests, as described below. Note that any single "bit"

described herein may in general be represented by multiple bits and be generically called an "indicator" for indicating a particular state.

Figure 5:
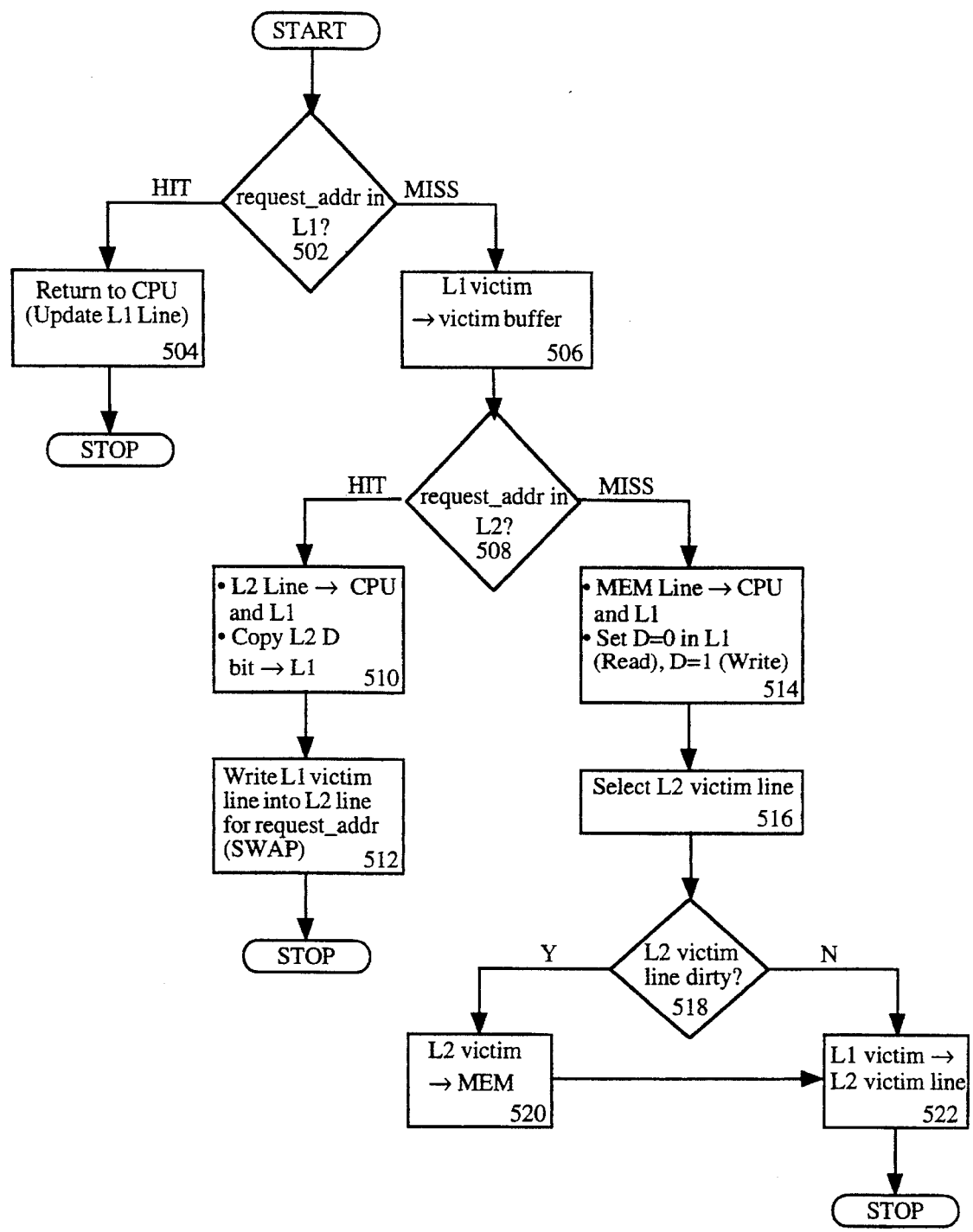
FIG. 5 is a flow chart illustrating the operation of the cache of the present invention without use of the first bit.

The operation of the present invention in the simple case without the first bit will be described with reference to the flowchart of FIG. 5. One skilled in the art should understand that the operations of the present invention are controlled by the cache access logic circuits of the caches in the multi-level cache configuration of the present invention.

This example assumes that the extension cache is an exclusion cache, i.e., that the contents of the primary and extension caches are mutually exclusive. The case of a noninclusive extension cache will be discussed later on.

Initially, a first processor coupled to the primary cache L1 of the present invention presents a memory access request denoted "request_addr" to the primary cache to determine a hit or a miss (step 502). If the comparison results in a hit, then the data is returned from the primary cache to the processor if the access request is a read operation. For a write operation, the data is written directly into the primary cache (step 504).

In the case of a primary cache miss, a line must be displaced from the primary cache so that the requested data may be cached into the primary cache from main memory. The present invention assumes that the least recently used (LRU) line will be displaced, although it should be understood that the present invention is applicable to any cache replacement policy. Therefore, the LRU line is chosen as the primary cache victim line and stored in a victim buffer (not shown) (step 506).

The request_addr is then presented to the extension cache to determine whether it is to be found in the extension cache (step 508). If this results in a hit, then the extension cache line containing the data is returned to the first processor and to the primary cache, and stored in the primary cache in the cache line vacated by the primary cache victim. Along with this operation the dirty bit of the extension cache line is copied along with the cache line into the primary cache (step 510). The primary cache victim from the victim buffer is written into the extension cache at the line formerly occupied by the extension cache line that was written into the primary cache, thereby performing a swap operation (step 512).

If, however, the requested data is not found in the extension cache, then the request_addr is presented to main memory (assuming for purposes of simplification that no cache follows the extension cache) and a block of data containing the requested data is returned to the first processor and the primary cache. For a write operation, the present invention assumes a write allocate policy for updating memory, although it should be understood that the present invention is applicable to any memory policy. If a write allocate operation is to be performed, then the write data is written into the primary cache after the requested line is fetched into the primary cache. In conjunction with these operations, the dirty bit in the primary cache is set to zero for a read operation to indicate cache consistency between the primary cache and main memory. Conversely, the dirty bit is set to one for a write operation to indicate that the primary cache, but not main memory has been updated (step 514).

The system selects a victim line in the extension cache, preferably according to the LRU policy (step 516), and determines whether the extension cache victim line is dirty (step 518).

If the extension cache victim is dirty, then this indicates that the victim line contains the most recent version of the data, and that such data is inconsistent with that found in main memory. Accordingly, the extension cache victim line is written into memory (step 520) before being overwritten with the primary cache victim from the victim buffer (step 522). Alternatively, if the extension cache victim line is clean, then main memory need not be updated, and the extension cache victim line may be overwritten with the primary cache victim (step 522).

The foregoing discussion assumes that the contents of the primary and extension caches are mutually exclusive. However, in many cache configurations this may not be the case, and the extension cache may be partially inclusive, i.e., both the primary and extension caches may cache some of the same memory locations. For example, FIGS. 6A and 6B illustrate a direct-mapped primary cache 602 having four lines direct-mapped to an extension cache having sixteen lines. Referring to FIG. 6A, if the processor references address A followed by a reference to address B, then data will be swapped back and forth between the primary and extension caches. Because addresses A and B map to different extension cache lines, swapping data at address A back to the extension cache will leave the extension cache unchanged if the primary cache victim line at A is clean with respect to the data at the same address in the extension cache 604.

Conversely, FIG. 6B illustrates a situation where address A and E are mapped to the same cache line. If alternating references are made to addresses A and E, then those lines will repeatedly exchange places between the primary and extension caches, while neither address will be able to occupy space in both the primary and extension caches.

Based on FIGS. 6A and 6B it can be seen that the swapping operation is unnecessary and superfluous if the primary cache victim line address is cached in the extension cache, and the primary cache line is not dirty. Put another way, swapping is necessary only if the primary cache victim address is not found in the extension cache or, if it is, the primary cache victim data is dirty with respect to the data found at the same address in the extension cache. The present invention takes advantage of this observation in order to prevent unnecessary swapping.

Figure 7:
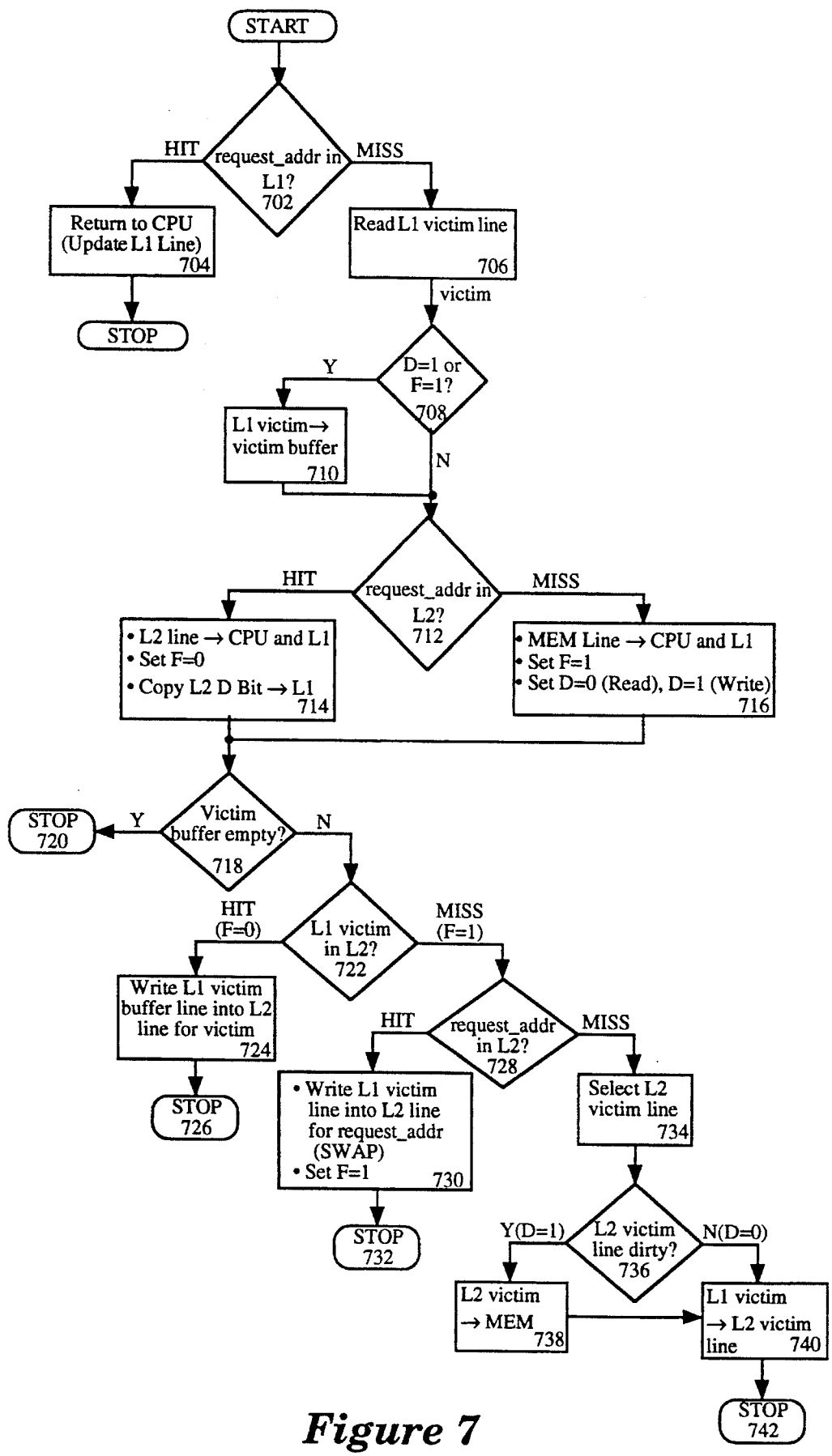
FIG. 7 is a flow chart illustrating the operation of the present invention.

FIG. 7 illustrates the operation of the present invention, wherein the first bit 412 and the dirty bit 408 shown in the cache of FIG. 4 are used to minimize swapping.

Under the control of cache access logic, it is first determined whether the requested address results in a hit or a miss in the primary cache (step 702). If so, the data is returned to the processor coupled to the primary cache, as before (step 704). If there is a miss, then the cache access logic reads the primary cache victim line (step 706). The cache access logic then determines whether the dirty (D) and/or first (F) bits are set (step 708). If the dirty bit is set this indicates that the primary cache holds the latest version of the data found at the address in the victim line and that such data is inconsistent with the data found in other memory devices, e.g., the extension cache and memory. If the first bit is set, this indicates that the address tag of the victim line matches in the primary cache only and not in the extension cache. If either the dirty or first bits is set, then the latest version of the data found in the victim line is not to be found in any other memory device. If D=1 or F=1, the victim line is temporarily stored in a victim buffer (not shown) so that it may be later saved in the next level cache (step 710).

Because the requested address was not found in the primary cache, it is presented to the extension cache to determine whether it is to be found there (step 712). If there is a hit, then the extension cache line containing the requested address data is transferred to the processor and the primary cache. Because the line came from the extension cache and was placed into the primary cache, the first bit is set to zero in the transferred line in the primary cache. To keep a record of whether the transferred cache line contains the latest version of the data, the dirty bit of the line is copied along with the line into the primary cache (step 714).

If however, a miss in the extension cache results, then the block of address locations from main memory is written into the primary cache and the data transferred to the processor. Because the data was sent directly to the primary cache without first being stored in the extension cache, the first bit is set to one. Further, for a read operation, because the primary cache and main memory contain the same data at the requested address, the dirty bit is set to zero to indicate consistency. Conversely, for a write operation, such as a write allocate, the dirty bit is set to one to indicate that the processor has changed the data (step 716).

From this point in the process, the logic of the present invention determines where to write the primary cache victim line. First, the logic determines whether any line was victimized from the primary cache in the first place (step 718). If the victim buffer is empty then the process stops (step 720). Otherwise, the logic determines whether the address of the data found in the primary cache victim is already present in the extension cache. To do so, the primary cache presents the address tag of the victim line to the extension cache. (step 722). If there is a hit, then this means that the first bit was not set. Referring back to step 708, the victim buffer is filled only if the dirty bit or first bit is set. Accordingly, the dirty bit must have been set (because the first bit is not set), meaning that the primary cache victim contains the latest version of the data found in the victim line. Accordingly, the primary cache victim is written from the victim buffer into the extension cache line allocated to the victim address (step 724). After this point the process terminates (step 726).

If, however, the primary cache victim is not found in the extension cache, i.e. the first bit of the victim line is set to one, then the logic determines again whether the requested address is found in the extension cache (step 728). To make this determination, a flag could have been set in step 712 to determine whether there is an extension cache hit or miss, and the flag tested in step 728. If the requested address is found in the extension cache then it is known that in step 714 the line caching that address was transferred to the primary cache and thus is no longer needed in the extension cache. Accordingly, that vacated extension cache line can receive the primary cache victim line, thereby resulting in a swap between the primary and extension caches. In conjunction with this operation, the first bit of the requested line in the primary cache is set to indicate that the requested line is no longer found in the extension cache because it has been overwritten with the primary cache victim line (step 730). At this point the process may terminate (step 732).

Conversely, if the requested address is not found in the extension cache, then no lines in the extension cache are currently likely to be available to receive the primary cache victim. Thus, in this embodiment, the LRU line of the extension cache may be selected as a victim (step 734). The dirty bit of this line is examined to determine whether the line contains the latest version of the data to be found at the addresses cached in that line, meaning that that data must be saved elsewhere (step 736). If the extension cache victim line is dirty, then the data from the line is used to update the data found at the same main memory addresses (or same addresses in the next level cache in another embodiment) (step 738) before the line in the extension cache is overwritten with the primary victim line (step 740).

If, however, the data in the extension cache victim line is consistent with that found in main memory, then that data is overwritten in the extension cache by the primary cache victim line without first storing the extension cache victim line into memory (step 740), and the process terminates (step 742).

By treating the next level cache as an extension of the primary cache, the present invention essentially treats the primary and extension caches together as one large cache, with the advantage of maintaining the most recently used portion of the cached data in the primary cache and thus closest to the processor. Consequently, the multi-cache configuration of the present invention has the effectiveness of a large cache. Every primary cache line with the first bit set avoids displacing another line in the extension cache, thus keeping more unique lines available in both caches for the processor to reference. Further, the present invention provides the advantage that swapping operations are minimized by using a bit to indicate whether a cache line in the primary cache is not found in the extension cache, i.e., the line is exclusive to the primary or the extension cache. One should note, however, that because of the lack of redundancy between the primary and extension caches, both the primary and extension caches must snoop the system bus for outside accesses to data stored in those caches.

It will be appreciated that various modifications and alterations might be made by those skilled in the art without departing from the spirit and scope of the present invention. One skilled in the art would understand that the present invention encompasses any multi-level cache design incorporating any number of caches. In particular, it is to be understood that the features in the primary cache may be found in higher level caches for a multi-level cache design incorporating more than two caches. Further, the present invention may be physically embodied in a variety of packages. The present invention may be built into one integrated circuit package or have its functionality spread over a number of chips, or be implemented by an emulator. Moreover, the invention may be constructed on chips of different materials, such as silicon or gallium arsenide. The invention should, therefore, be measured in terms of the claims which follow.

What is claimed is:

1. In an exclusive or partially inclusive multilevel memory configuration having at least a primary cache coupled to a secondary cache, a method for accessing cache memory that minimizes swapping comprising the steps of:

receiving at the primary cache a memory access request specifying a request address;

determining whether the memory access request results in a hit or a miss at the primary cache;

if the memory access request results in a hit, the primary cache responding to the memory access request;

if the memory access request results in a miss at the primary cache:

selecting a primary cache victim line, the primary cache victim line including a dirty bit and a first indicator;

determining whether the dirty bit of the primary cache victim line is set or the first indicator of the primary cache victim line is in a new state;

if the dirty bit of the primary cache victim line is set or the first indicator of the primary cache victim line is in a new state, storing the primary cache victim line into the secondary cache;

if the dirty bit of the primary cache victim line is not set or the first indicator of the primary cache victim line is in an old state, disposing of the primary cache victim line;

determining whether the memory access request results in a hit or a miss at the secondary cache;

if the memory access request results in a hit at the secondary cache, the secondary cache responding to the memory access request.

2. The method of claim 1, wherein at least one primary cache line has the first indicator, wherein the first indicator has a new state for indicating that the address tag of the primary cache line does not match an address tag of the secondary cache and an old state for indicating that the address tag of the primary cache line matches an address tag of the secondary cache, such that if the primary cache line is selected as the primary cache victim line, swapping between the primary cache and the secondary cache may be minimized based upon the state of the first indicator.

3. The method of claim 1, wherein the multilevel memory configuration further comprises a tertiary memory device coupled to the secondary cache, the method further comprising the steps of:

if the memory access request results in a miss at the secondary cache:

determining whether an entry associated with the request address is found in the tertiary memory;

if an entry associated with the request address is found in the tertiary memory:

the tertiary memory responding to the memory access request.

4. The method of claim 1, wherein the secondary cache is noninclusive with respect to the primary cache.

5. The method of claim 1, wherein the primary and secondary caches do not cache any entries associated with the same address.

6. The method of claim 3, further comprising the steps of:

if the memory access request results in a miss at the primary cache:

if an address tag of the primary cache victim line matches an address tag of an entry in the secondary cache and the primary cache victim line is dirty, updating the matching entry in the secondary cache with the primary cache victim line from the primary cache;

if an address tag of the primary cache victim line does not match an address tag of the secondary cache:

if the memory access request resulted in a hit in the secondary cache, storing the primary cache victim line at an entry in the secondary cache that caused the hit, wherein the entry that caused the hit is associated with the request address;

if the memory access request resulted in a miss in the secondary cache, selecting a secondary cache victim line from an associated secondary cache victim entry, and determining whether the secondary cache victim line is dirty;

if the secondary cache victim line is dirty, storing the secondary cache victim line into tertiary memory;

whether or not the secondary cache victim line is dirty, storing the primary cache victim line at the associated secondary cache victim entry.

7. The method of claim 6, wherein the step of the secondary cache responding to the memory access request includes the steps of storing a secondary cache line associated with the request address into the primary cache, and setting to an old state a first indicator of the stored secondary cache line in the primary cache, the old state for indicating that the address tag of the stored secondary cache line in the primary cache matches an address tag in the secondary cache, and the method further comprises the step of:

after storing the primary cache victim line at an entry in the secondary cache that caused the hit, setting to a new state the first indicator of the stored secondary cache line in the primary cache that is associated with the request address, the new state for indicating that the address tag of the stored secondary cache line in the primary cache does not match an address tag in the secondary cache.

8. The method of claim 1, wherein the step of the primary cache responding to the memory access request comprises the steps of:

in response to a read request, returning a primary cache line associated with the request address; and in response to a write request, further including the step of:

storing write data into the returned primary cache line in the primary cache at the request address.

9. The method of claim 1, wherein the step of the secondary cache responding to the memory access request comprises the steps of:

in response to a read request, storing a secondary cache line associated with the request address into the primary cache; and in response to a write request, further including the step of:

storing write data into the stored secondary cache line in the primary cache at the request address.

10. The method of claim 9, wherein the step of storing the secondary cache line further comprising the step of setting a first indicator of the stored secondary cache line in the primary cache to an old state, the old state for indicating that the address tag of the stored secondary cache line in the primary cache matches an address tag of the secondary cache.

11. The method of claim 9, wherein if the memory access request results in a hit in the secondary cache:

the step of storing the secondary cache line includes the step of writing the secondary cache line into an entry of the primary cache associated with the primary cache victim line.

12. The method of claim 3, wherein the step of the tertiary memory responding to the memory access request comprises the steps of:

in response to a read request, returning a block of memory locations including a location specified by the request address;

storing the block of memory locations into a cache line of the primary cache; and in response to a write request, further including the steps of:

storing write data into the cache line in the primary cache at the request address.

13. The method of claim 12, further comprising the step of setting to a new state the first indicator of the primary cache line storing the block of memory locations, the new state for indicating that an address tag of the primary cache line storing the block of memory locations does not match an address tag of the secondary cache.

14. The method of claim 12, wherein the step of storing the block of memory locations includes the step of writing the block of memory locations into an entry of the primary cache associated with the primary cache victim line.

15. The method of claim 1, further including the step of:
selecting each cache victim line according to an LRU cache replacement policy.

16. In an exclusive or partially inclusive multilevel memory configuration having at least a primary cache coupled to a secondary cache, the primary cache comprising:
a plurality of primary cache entries, each primary cache entry having a primary cache line including:
an address tag;
a data field for storing data;
a dirty indicator having a dirty state for indicating whether a primary cache line is dirty;
a first indicator having a new state for indicating that the address tag of the primary cache line does not match an address tag of the secondary cache, the first indicator further having an old state for indicating that the address tag of the primary cache line matches an address tag of the secondary cache, such that swapping between the primary cache and secondary cache is minimized based upon the state of the first indicator;
a primary cache logic circuit for determining whether a memory access request hits or misses in the primary cache, wherein the memory access request specifies a request address and if the memory access request misses in the primary cache:
the primary cache logic circuit selects a primary cache victim line;
if the first indicator is in the new state, or if the primary cache victim line dirty indicator is in the dirty state, the primary cache logic circuit writes the primary cache victim line into the secondary cache.

17. The primary cache of claim 16, wherein if the memory access request misses in the primary cache, the primary cache logic circuit further comprises circuitry for sending an address tag of the primary cache victim line to the secondary cache.

18. An exclusive or partially inclusive multilevel memory configuration comprising:
a primary cache;
a secondary cache, coupled to the primary cache;
the primary cache having:
a plurality of primary cache entries, each primary cache entry having a primary cache line including:
an address tag;
a data field for storing data;
a dirty indicator having a dirty state for indicating whether a primary cache line is dirty;
a first indicator having a new state for indicating that the address tag of the primary cache line does not match an address tag of the secondary cache, the first indicator further having an old state for indicating that the address tag of the primary cache line matches an address tag of the secondary cache, such that swapping between the primary cache and secondary cache is minimized based upon the state of the first indicator;
a primary cache logic circuit for determining whether a memory access request hits or misses in the primary cache, wherein the memory access request specifies a request address tag, and if the memory access request misses in the primary cache:
the primary cache logic circuit selects a primary cache victim line;
if the first indicator is in the new state, or if the primary cache victim line dirty indicator is in the dirty state, the primary cache logic circuit writes the primary cache victim line into the secondary cache;
the secondary cache having:
a plurality of secondary cache entries, each secondary cache entry having a secondary cache line including:
an address tag;
a data field for storing data;
a dirty indicator having a dirty state for indicating whether a secondary cache line is dirty;
a secondary cache logic circuit for receiving an address tag and for determining whether the address tag hits or misses at an entry in the secondary cache.

19. The multilevel memory configuration of claim 18, wherein if the first indicator of the primary cache victim line is in the old state, and the primary cache victim line dirty indicator is in the dirty state:
the primary cache logic circuit sends the address tag of the primary cache victim line to the secondary cache, and
the secondary cache logic circuit stores the primary cache victim line into the secondary cache entry at which the primary cache victim line address tag hits.

20. The multilevel memory configuration of claim 19, wherein
the secondary cache logic circuit includes logic for performing the following functions if the first indicator of the primary cache victim line is in the new state:
if the request address tag hits in the secondary cache, the secondary cache logic circuit stores the primary cache victim line into the secondary cache entry at which the request address tag hits;
if the request address tag misses in the secondary cache:
the secondary cache logic circuit selects a secondary cache victim line;
stores the secondary cache victim line into a tertiary memory if the secondary cache victim line is dirty; and
stores the primary cache victim line into an entry of the secondary cache associated with the secondary cache victim line.

21. The multilevel memory configuration of claim 20, wherein
the secondary cache logic circuit further comprises circuitry for writing the cache line from the secondary cache entry at which the request address tag hits to the primary cache entry associated with the primary cache victim line, and wherein
the primary cache logic circuitry further includes circuitry for setting to the new state the first indicator of the primary cache entry that holds the cache line from the secondary cache entry at which the request address tag hit, the new state being set in response to the secondary cache logic circuit storing the primary cache victim line into the secondary cache entry at which the request address tag hit.

22. The multilevel memory configuration of claim 18, wherein the secondary cache logic circuit further comprises circuitry for writing the cache line from the secondary cache entry at which the request address tag hits to the primary cache entry associated with the primary cache victim line.

23. The multilevel memory configuration of claim 22, wherein the primary cache logic circuit further comprises circuitry for setting the first indicator to the old state upon writing the cache line from the secondary cache entry at which the request address tag hits to the primary cache entry associated with the primary cache victim line.

24. The multilevel memory configuration of claim 20, further comprising:

a tertiary memory device coupled to the secondary cache;

a bus coupled to the secondary cache and to the tertiary memory; and a processor, coupled to the primary cache and to the bus, for issuing memory access requests.

* * * * *